Nov. 18, 1958     A. SALZER     2,861,195
HYDROELECTRIC POWER SYSTEM
Filed March 15, 1957     2 Sheets-Sheet 1
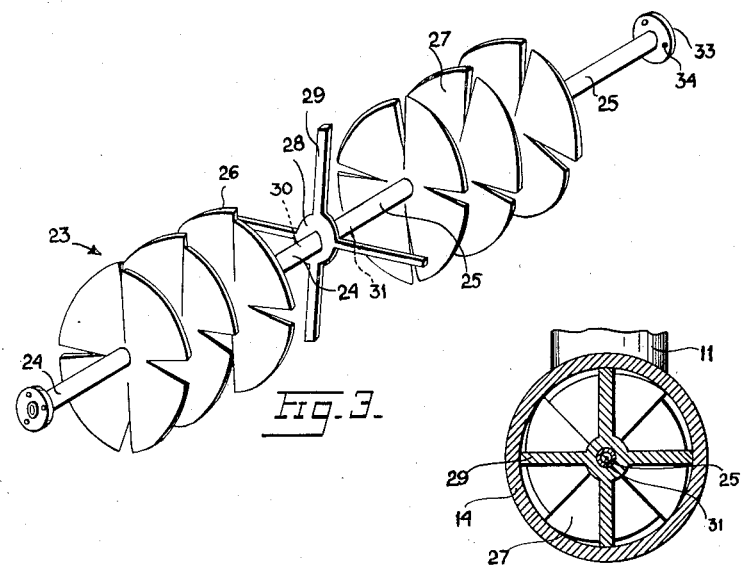
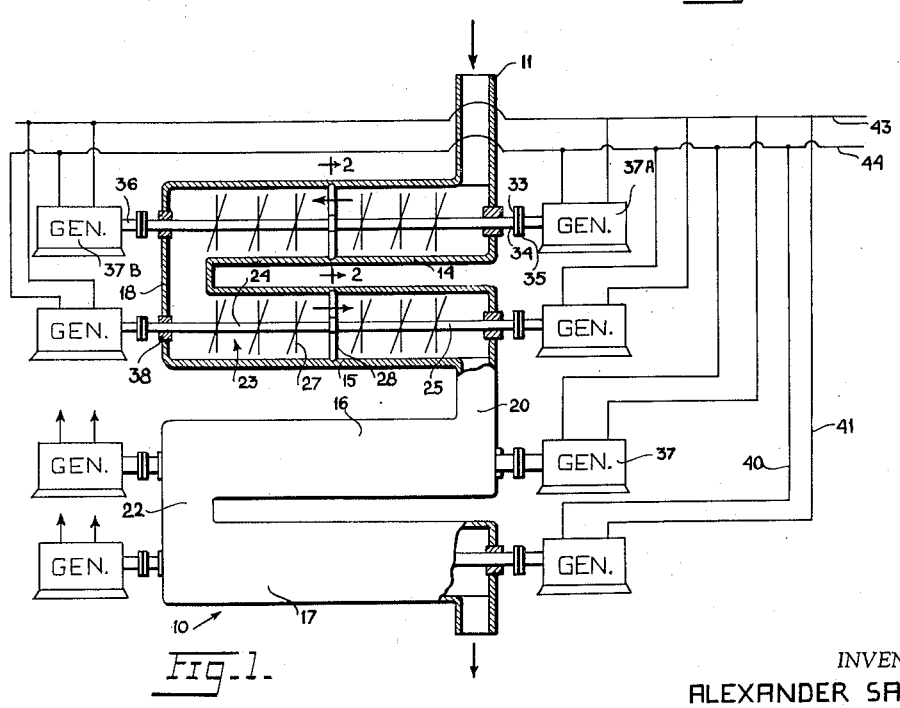
INVENTOR.
ALEXANDER SALZER
BY
*ATTORNEY*

Nov. 18, 1958    A. SALZER    2,861,195
HYDROELECTRIC POWER SYSTEM
Filed March 15, 1957    2 Sheets-Sheet 2

INVENTOR.
ALEXANDER SALZER
BY *Zoltan F. Holochek*
ATTORNEY

United States Patent Office 2,861,195
Patented Nov. 18, 1958

2,861,195

HYDROELECTRIC POWER SYSTEM

Alexander Salzer, New York, N. Y.

Application March 15, 1957, Serial No. 646,291

9 Claims. (Cl. 290—4)

This invention relates to a power generating device and particularly concerns a hydroelectric apparatus.

It is a principal object to provide a means for driving a plurality of electricity generators simultaneously from a single source of water power.

It is a further object to provide a tandem turbine assembly useful in a hydroelectric system.

It is a further object to provide a hydroelectric system in which a water channel is arranged with a plurality of convolutions adapted to be selectively by-passed.

It is a further object to provide a turbine rotor having a plurality of independently rotatable sections.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a diagrammatic representation of a system embodying the invention, parts being shown in section.

Fig. 2 is a sectional view taken on lines 2—2 of Fig. 1 through a conduit of the system.

Fig. 3 is a perspective view of a double rotor employed in the system.

Figure 6:
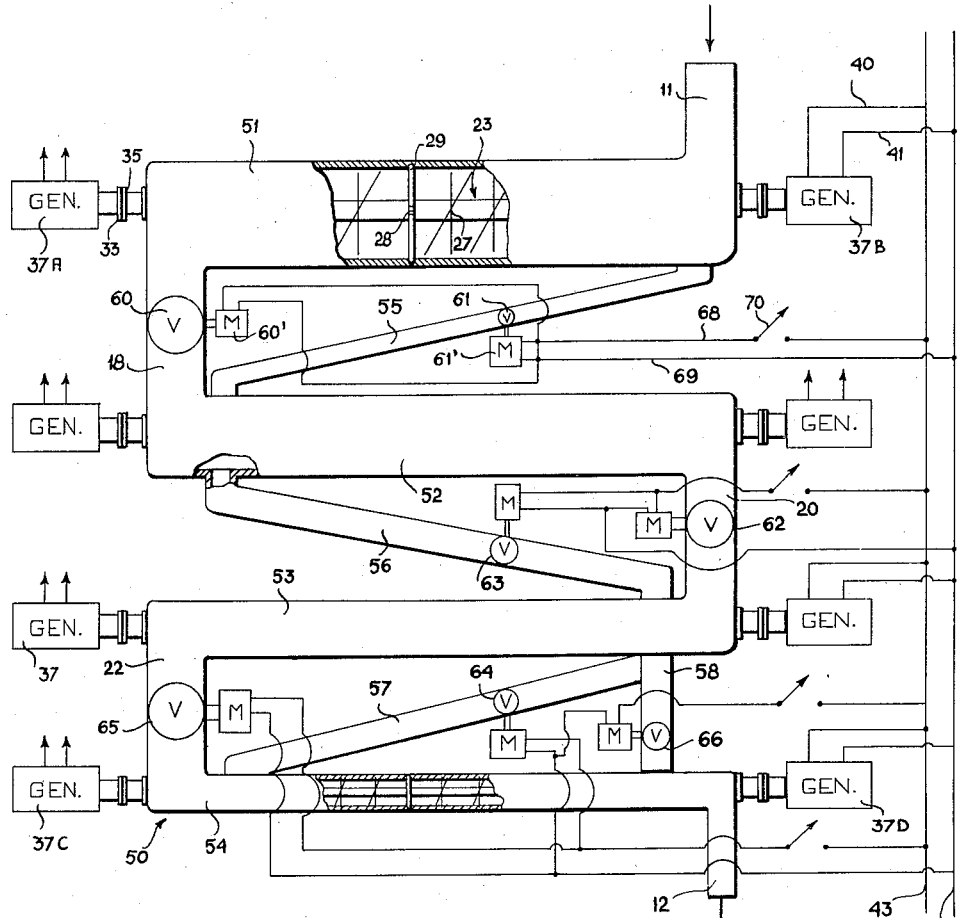
Fig. 6 is a plan view partially diagrammatic of another form of the system embodying the invention, parts being shown broken away.
Figure 4:
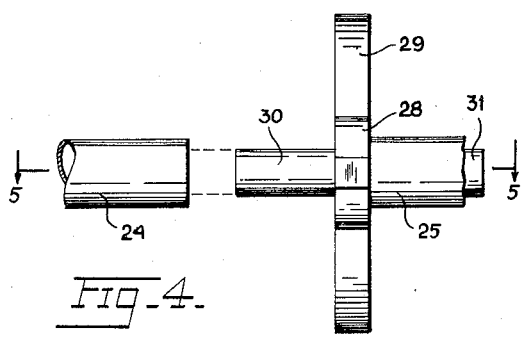
Fig. 4 is an exploded side elevational view of portions of the double rotor.
Figure 5:
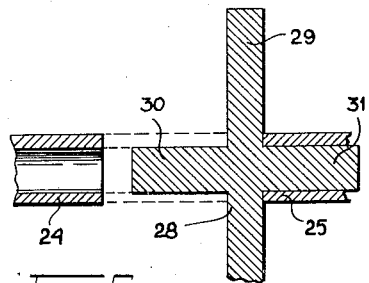
Fig. 5 is an exploded sectional view taken on lines 5—5 of Fig. 4.

In Fig. 1 there is shown a sinuous conduit 10 through which water may be passed from the inlet 11 to the outlet 12. The conduit has a plurality of loops including straight cylindrical sections 14, 15, 16, 17. Connecting the sections 14—17 are the end sections 18, 20, 22. Sections 14—17 are disposed parallel to each other. Centrally located within each section 14—17 is a rotor 23 which is best shown in Figs. 2–5. The rotor has two independently rotatable members including sleeve shafts 24, 25 and fixed rotor blades 26. A plurality of blades 26 are mounted in spaced alignment on each shaft. Each blade has a plurality of vanes 27. The vanes in one rotor section are all twisted one way and the vanes in the other rotor section are twisted in an opposite manner. When water flows past the vanes in one direction, one rotor section rotates clockwise and the other rotor section rotates counterclockwise with respect to the aligned axes of the rotor sections. A spider 28 has a plurality of radially extending arms 29 which are secured by welding or otherwise inside the conduit sections. Integrally formed with the spider are a pair of axially extending stationary shafts 30, 31. Shafts 30 and 31 are not visible in Fig. 3 but the fact that they are enclosed in shafts 24 and 25, respectively, is indicated by the use of broken lead lines extending from reference characters 30 and 31 to shafts 24 and 25, respectively. These shafts may extend any desired distance into the sleeve shafts 24, 25. The rotor sections are thus each journaled on one of shafts 30, 31. Shafts 24, 25 terminate in flanges 33. The flanges may have apertures 34 through which suitable bolts may be inserted for connecting the respective sleeve shafts to flanges 35 mounted on the ends of generator shafts 36. Shafts 36 are drive members of conventional electrical generators 37 employed in the system.

Sleeve shafts 24, 25 pass through bearings 38 in the connecting conduit sections 18, 20, 22. The bearings 38 are suitably packed to prevent leakage of water as the sleeve shafts rotate in them. Each generator has a pair of electric wires 40, 41 by which it delivers electrical energy to the bus bars 43, 44.

As water flows through the sinuous conduit 10 from inlet 11 to outlet 12 the rotor sections of each double rotor 23 will rotate in opposite directions. The generator pairs at each end of the conduit sections such as 37ª and 37ᵇ are oriented so that the shafts 36 of their generators are in alignment and point toward each other. Thus the rotors of the generator pairs at the same end of the conduit sections all rotate in the same direction and the corresponding wires of their generators have the same polarity. This simplifies the assembly of the system. Also, this symmetrical arrangement is rotationally balanced for most effective utilization of the energy derived from the flowing water in the conduit. Four sections of the conduit are shown in the drawings but the system may be constructed with more or less sections as desired. For each section of conduit there will always be provided a pair of oppositely rotating generators. The independent rotation of the several sections of the turbine rotors insures that each generator is rotated independently and is not mechanically loaded by rotation of the other generator in its pair or any other adjacent generator located along the system.

In Fig. 6, the sinuous conduit 50 is provided with straight sections 51, 52, 53, 54 which progressively decrease in diameter. Within the conduit sections 51—54 are mounted double rotors. The diameters of the blades are, of course, adapted in size to the interior diameters of the conduit sections. A plurality of pairs of generators 37 are provided as in the system of Fig. 1. Electrical energy is delivered to bus bars 43, 44 by wires 40, 41. A by-pass pipe 55 is connected between the inlet end of section 51 and the inlet end of section 52. Another by-pass pipe section 56 is connected between the inlet end of section 52 and the inlet end of section 53. A further by-pass section 57 is connected between the inlet end of section 53 and the inlet end of section 54. If desired, a branch by-pass section 58 can be connected between the inlet of section 53 and the outlet end of section 54 or the outlet 12. By-pass 57 can be connected to by-pass 58 as shown in the drawing. Suitable gate valves V are disposed in each of pipe sections 18, 20, 22, and by-pass sections 55, 56, 57, 58. Each valve is driven in conventional manner by a motor M. The valves and motors are arranged in pairs. Thus valves 60—61, 62—63 and 64—65 constitute simultaneously operated pairs. Valves 64, 66 are also operated as a pair as will be described. The two motors which drives each pair of valves are connected in the same circuit. Thus motor 60' and motor 61' are connected in parallel to the bus bars 43, 44 by wires 68, 69. A switch 70 controls the motor power supply circuit. A similar arrangement is used for the other motor pairs.

The valves are so arranged that when one valve of a pair is open the other valve of the pair is closed. Thus, when valve 60 in pipe section 18 is open, valve 61 in by-pass section 55 is closed. When switch 70 is closed the motors 60', 61' actuate the two valves simultaneously. When the desired valve is open and its paired valve is closed, the switch 70 may be opened to stop the motors. If for any reason it is desired to stop rotation of any of the generators, for example, 37ª and 37ᵇ, for repair or other purpose, valve 60 will be closed and by-pass valve 61 will be opened to divert the flow of water from section 50 to section 51.

When it is desired to deactivate generators 37ᶜ and 37ᵈ, the water may be diverted from the section 20 directly to the outlet 12. This is done by closing both valves 65 and 64 and opening valve 66 by operation of their drive motors through the appropriate control switches.

The pipe sections 51—54 are made progressively smaller in diameter so the water passing therethrough will have a higher speed. This makes it possible to use smaller generators operating at higher speed to produce the same energy output as larger generators operating at lower speed. Also, in the event of curtailed water supply, the larger sections of the conduit 50 can be by-passed and only the smaller sections with their smaller generators used. The system of Fig. 6 employing by-passing pipe sections 55—58 can, of course, be used with all sections 51—54 having the same diameter so that all generators 37 will be of equal size.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A hydroelectric power system, comprising a sinuous conduit having a plurality of looped sections, each of said sections being straight, the several sections being disposed parallel to each other, each of said sections being cylindrical in form, a rotor axially disposed in each of said sections, said rotor including two independently rotatable members, each of said members being a sleeve shaft with a plurality of spaced blades mounted thereon, said blades having vanes twisted so that water passing through each pipe section rotates one rotor member in one direction and the other rotor member in an opposite direction, a spider centrally disposed in each of said sections, a pair of stationary shafts respectively extending axially into one end of the sleeve shafts of the rotor members and serving as journal bearings therefor, the other ends of said sleeve shafts being journaled in opposite walls of the conduit and extending therefrom, and a plurality of electrical generators, each generator having a shaft in axial alignment with the sleeve shafts of a pair of rotor members, each of said generators having wires connected to a pair of bus bars for delivering electrical energy thereto.

2. A hydroelectric power system, comprising a conduit having a plurality of looped sections, each of said sections being straight, the several sections being disposed parallel to each other, each of said sections being cylindrical in form, a rotor axially disposed in each of said sections, said rotor including two independently rotatable members, each of said members being a sleeve shaft with a plurality of spaced blades mounted thereon, said blades having vanes twisted so that water passing through each pipe section rotates one rotor member in one direction and the other rotor member in an opposite direction, a spider centrally disposed in each of said sections, and a pair of stationary shafts extending axially into one end of the sleeve shafts of the rotor members and serving as journal bearings therefor, the other ends of said sleeve shafts being journaled in opposite walls of the conduit and extending therefrom.

3. A hydroelectric power system, comprising a conduit having a plurality of looped sections, each of said sections being straight, the several sections being disposed parallel to each other, each of said sections being cylindrical in form, a rotor axially disposed in each of said sections, said rotor including two independently rotatable members, each of said members being a sleeve shaft with a plurality of spaced blades mounted thereon, said blades having vanes twisted so that water passing through each pipe section rotates one rotor member in one direction and the other rotor member in an opposite direction, a bearing member centrally disposed in each of said sections, and a pair of stationary shafts extending respectively into one end of the sleeve shafts of the rotor members and serving as journal bearings therefor, the other ends of said sleeve shafts being journaled in opposite walls of the conduit and extending therefrom.

4. A hydroelectric power system, comprising a conduit having a plurality of looped sections, each of said sections being straight, the several sections being disposed parallel to each other, each of said sections being cylindrical in form, a rotor axially disposed in each of said sections, said rotor including two independently rotatable members, each of said members being a sleeve shaft with a plurality of spaced blades mounted thereon, said blades having vanes twisted so that water passing through each pipe section rotates one rotor member in one direction and the other rotor member in an opposite direction, and a bearing in each of said sections serving as a journal means for said rotor members, said sleeve shafts being further journaled in opposite walls of the conduit and extending therefrom for coupling connection with a plurality of generators.

5. A rotor for use in a hydroelectric system, comprising a pair of sleeve shafts, a plurality of spaced blades disposed in each of said shafts, each of said blades having twisted vanes, the vanes on one shaft being oppositely twisted from the vanes on the other shaft, a spider having radially extending arms, and a pair of aligned shafts integrally formed therewith, said aligned shafts extending perpendicular to said arms, said sleeve shafts being respectively journaled on the aligned shafts for rotation in opposite directions thereon.

6. A rotor for use in a hydroelectric system, comprising a pair of sleeve shafts, a plurality of spaced blades disposed in each of said shafts, each of said blades having twisted vanes, the vanes on one shaft being oppositely twisted from the vanes on the other shaft, a stationary bearing member, said shafts being journaled on the stationary member for independent rotation thereon in opposite directions, said bearing member being a spider with radially extending arms.

7. A hydroelectric power system, comprising a sinuous conduit having a plurality of cylindrical sections, each of said sections being straight, the several sections being disposed parallel to each other and having different diameters, successive sections having smaller diameters from one end to another of the conduit, a plurality of by-pass pipes, each of said pipes being connected from an inlet portion of one of the sections to an inlet portion of the next successive section, a first valve disposed in each of said pipes, each of said sections being joined by connection pipe members, another valve disposed in each of said pipe members, one of said first valves and one of said other valves constituting a pair, a pair of motors respectively driving said pair of valves to open one valve while closing the other valve, said motors being connected in a common circuit controlled by a single switch, a rotor axially disposed in each of said cylindrical sections, each of said rotors including two independently rotatable rotor members, each of the rotor members including a sleeve shaft with a plurality of spaced blades thereon, each of the blades having twisted vanes thereon, the vanes being so twisted that water passing through the conduit rotates one rotor member in one direction and the other rotor member in another direction, said rotors being journaled for rotation in the conduit and having ends of the sleeve shafts extending through the conduit, a plurality of electrical generators, each generator having a shaft in axial alignment with the sleeve shafts of a pair of rotor members, each of said generators having wires connected to a pair of bus bars for delivering electrical energy thereto, each of said circuits being connected to said bus bars.

8. A hydroelectric power system, comprising a sinuous conduit having a plurality of cylindrical sections, each of said sections being straight, the several sections being disposed parallel to each other, a plurality of by-pass pipes, each of said pipes being connected from an inlet portion of one of the sections to an inlet portion of the next successive section, a first valve disposed in each of said pipes, each of said sections being joined by connection pipe members, another valve disposed in each of said pipe members, one of said first valves and one of said other valves constituting a pair, a pair of motors respectively driving said pair of valves to open one valve while closing the other valve, said motors being connected in a common circuit controlled by a single switch, a rotor axially disposed in each of said cylindrical sections, each of said rotors including two independently rotatable rotor members, each of the rotor members including a sleeve shaft with a plurality of spaced blades thereon, each of the blades having twisted vanes thereon, the vanes being so twisted that water passing through the conduit rotates one rotor member in one direction and the other rotor member in another direction, said rotors being journaled for rotation in the conduit and having ends of the sleeve shafts extending through the conduit, a plurality of electrical generators, each generator having a shaft in axial alignment with the sleeve shafts of a pair of rotor members, each of said generators having wires connected to a pair of bus bars for delivering electrical energy thereto.

9. A hydroelectric power system, comprising a sinuous conduit having a plurality of cylindrical sections, each of said sections being straight, a plurality of by-pass pipes, each of said pipes being connected from an inlet portion of one of the sections to an inlet portion of the next successive section, a first valve disposed in each of said pipes, each of said sections being joined by connection pipe members, another valve disposed in each of said pipe members, one of said first valves and one of said other valves constituting a pair, a pair of motors respectively driving said pair of valves to open one valve while closing the other valve, said motors being connected in a common circuit controlled by a single switch, a rotor axially disposed in each of said cylindrical sections, each of said rotors including two independently rotatable rotor members, each of the rotor members including a sleeve shaft with a plurality of spaced blades thereon, each of the blades having twisted vanes thereon, the vanes being so twisted that water passing through the conduit rotates one rotor member in one direction and the other rotor member in another direction, said rotors being journaled for rotation in the conduit and having ends of the sleeve shafts extending through the conduit.

References Cited in the file of this patent

UNITED STATES PATENTS

| | | |
|---|---|---|
| 600,007 | Langer | Mar. 1, 1898 |
| 608,969 | Parsons | Aug. 9, 1898 |
| 656,051 | Scovel et al. | Aug. 4, 1900 |
| 716,650 | Wheeler et al. | Dec. 23, 1902 |
| 777,865 | Stumpf | Dec. 20, 1904 |
| 1,960,744 | Ljungstrom | May 29, 1934 |
| 2,709,755 | Potter | May 31, 1955 |